INVENTORS
F. E. WILEY
J. C. FANTONE

April 21, 1970   F. E. WILEY ET AL   3,507,005
BLOW MOLDING IN MULTI-STATION BLOW MOLDING DEVICE
Filed Nov. 27, 1967   9 Sheets-Sheet 4

INVENTORS
F. E. WILEY
J. C. FANTONE
BY Young + Quigg
ATTORNEYS

April 21, 1970    F. E. WILEY ET AL    3,507,005
BLOW MOLDING IN MULTI-STATION BLOW MOLDING DEVICE
Filed Nov. 27, 1967    9 Sheets-Sheet 5

INVENTORS
F. E. WILEY
J. C. FANTONE
BY
Young + Quigg
ATTORNEYS

INVENTORS
F. E. WILEY
J. C. FANTONE

ATTORNEYS

[United States Patent Office — 3,507,005 — Patented Apr. 21, 1970]

3,507,005
BLOW MOLDING IN MULTI-STATION BLOW MOLDING DEVICE
Fred E. Wiley, Longmeadow, Mass., and Joseph C. Fantone, West Hartford, Conn., assignors to Phillips Petroleum Company, a corporation of Delaware
Filed Nov. 27, 1967, Ser. No. 685,818
Int. Cl. B29c 17/07; B29d 23/03
U.S. Cl. 18—5                 11 Claims

ABSTRACT OF THE DISCLOSURE

A blow molding apparatus has a supply hopper, a feeding system for transferring hollow parisons from the hopper to a feeding device which moves parisons into a heating means, for example into holes in a heating wheel containing two concentric rows of heating holes, means for removing heated parisons from the heating device and transferring the parisons to a multi-station blow molding device in which each parison is pinched off, stretched, and blown to form a final article. In the first station the article is pinched off and stretched longitudinally. In the second station the article is blown, and thereafter the blown article is ejected.

BACKGROUND OF INVENTION

This invention relates to apparatus for blow molding preformed parisons to form biaxially oriented hollow objects.

While the blow molding art goes back over 100 years, it has only been in the last 10 years that blow molding of hollow plastic articles has achieved significant commercial success. With this expanded utilization of blow molding techniques has come ever more rigorous requirements from the purchasers of the finished product with regard to the appearance, durability, chemical resistance, low cost and the like, of the product.

It is a well-known fact that many polymers which are particularly suitable for blow molding such as the olefin polymers undergo the phenomenon known as orientation when stretched in the solid state at a temperature just below their crystalline melting point. Since this orientation can result in as much as a twenty-fold increase in tensile strength it was only natural that attempts would be made to utilize this phenomenon in the production of blow molded hollow articles such as bottles. Since the greatest orientation occurs at a temperature just below the crystalline melting point while the polymer is on a heating cycle and in a partially crystalline state, it was early recognized that little orientation could be effected in a conventional blow molding operation wherein a molten parison was extruded between mold halves and blown; first the temperature of the parison could not be controlled closely enough and second the slight orientation achieved was predominantly in the circumferential direction since little or no stretching in the longitudinal direction occurred. One method of achieving the desired product is to extrude or mold a parison preform, cool it to room temperature, carefully reheat it to just below its crystalline melting point, grasp the preform at both ends and stretch it longitudinally thus imparting orientation in that direction, and then place it quickly in a mold and introduce fluid pressure into the interior of the parison to stretch it circumferentially until it conforms to the contour of the mold so as to impart orientation in a second direction. Such a procedure achieves a product of exceptional stretch, and surprisingly, in the case of such materials as polypropylene, almost perfect clarity. It is apparent however that such a process is complex and does not lend itself readily to the type of high speed fabrication essential to supply the need for low cost highly durable bottles and the like.

SUMMARY OF THE INVENTION

It is an object of this invention to provide an improved apparatus for blow molding a biaxially oriented hollow article.

It is a further object of this invention to provide an improved apparatus for feeding a parison to a heating device.

It is a further object of this invention to provide an improved heating device for thermoplastic parisons.

It is yet another object of this invention to provide a device for blow molding hollow articles in which the time for each article produced is substantially reduced.

It is still another object of this invention to provide an improved means for transferring a parison from a heating station to a molding device.

In accordance with this invention a parison of a thermoplastic material is heated to a temperature just below the crystalline melting point of the thermoplastic material; transferred to a first station where the parison is held at one end, pinched or clamped at the other end and stretched longitudinally; moved to a second station while still held at the first end, enclosed by mold parts and expanded to conform to the shape of the mold while a second parison is being gripped and stretched in the first station; and thereafter ejected.

BRIEF DESCRIPTION OF THE DRAWINGS

In the drawings, forming a part hereof, wherein like reference characters denote like parts in the various views

DESCRIPTION OF THE PREFERRED EMBODIMENTS

The process and apparatus of this invention are applicable for the formation of biaxially oriented hollow thermoplastic articles such as bottles and other containers, toys, lamp shades and other molded products, and the like.

Any orientable thermoplastic resin can be used in the practice of this invention. Examples of suitable resins include polymers and copolymers of 1-olefins, poly(vinyl chloride), and the like. Preferred materials are polymers and copolymers of ethylene, propylene and 1-butane, with polypropylene being especially preferred. These polymers are extruded or molded into parison preforms and cooled to a temperature below their crystalline freezing point. They are then heated to orientation temperature which is generally about 1 to 50° F. below their crystalline melting temperature and oriented as will be described hereinafter. The crystalline melt point can be determined by heating a sample of the material under a polarizing microscope. The specimen is heated slowly and the point at which the last birefringence disappears is the crystalline melt point.

Figure 2:
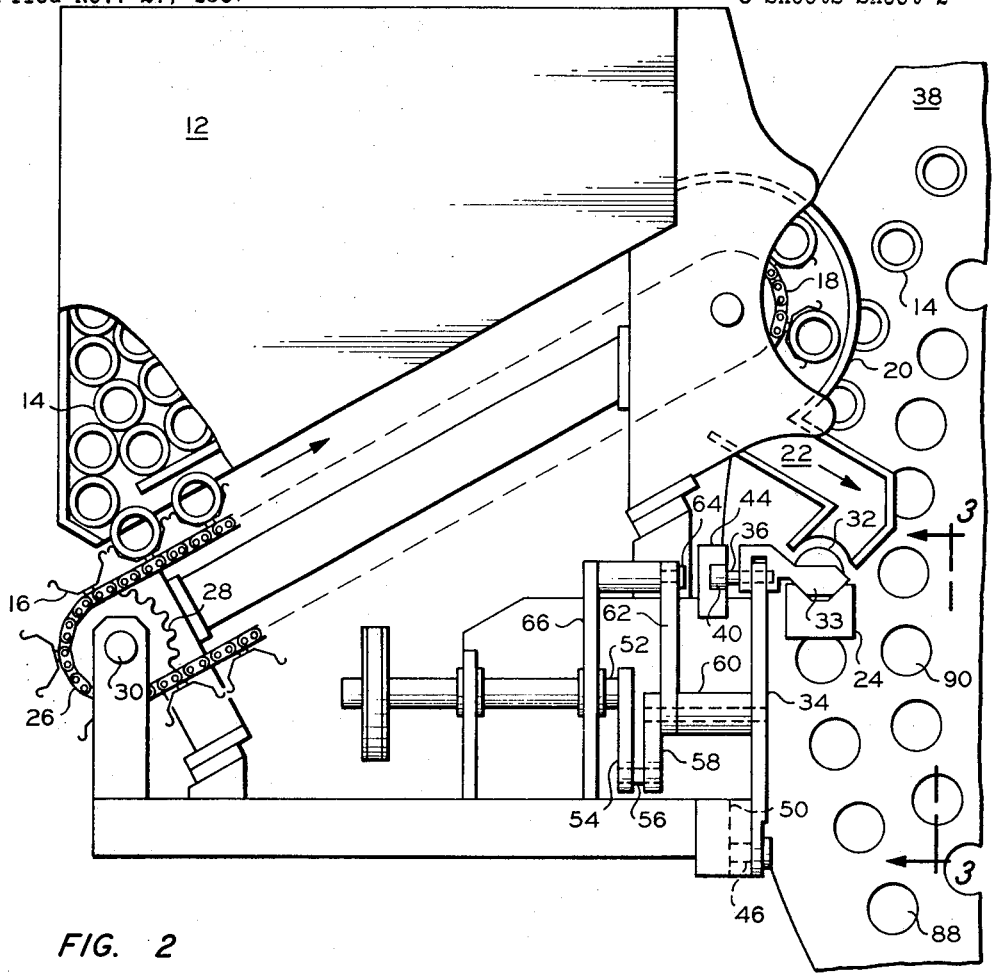
FIGURE 2 is a side elevation of the parison feeder.
Figure 3:
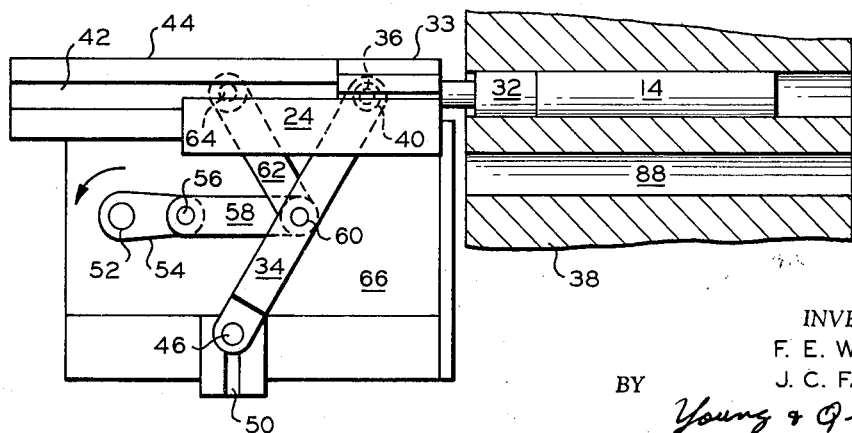
FIGURE 3 is a view along lines 3—3 of FIGURE 2 except in FIGURE 2 the crank is shown in the down position.

Referring now specifically to FIGURES 2 and 3, a hopper 12 is provided with a plurality of parisons 14. A multi-trough conveyor belt 16 travels upwardly at an angle through the hopper 12 and picks up parisons. The parisons are carried around the end 18 of the conveyor system thus traveling in a circular path abou a horizontal axis and are held in place by shield 20 as the troughs are inverted. The parisons are then passed through chute 22 which serves as a conduit means between the termination of said shield and loading track 24. The conveyor system 26 is driven about sprocket 28 through shaft 30. A push member 32 connected to arm 34 through pin 36 pushes the parisons 14 into holes in a parison heating wheel 38. The push member 32 is also connected through pin 36 to follower 40 which slides in track 42 in block 44. The push member 32, fixed to guide block 33, is actuated by arm 34 which is slidably pinned with pin 46 which serves as a reciprocating guide member reciprocating vertically in channel 50. Constantly rotating shaft 52 supplies power for the reciprocation of arm 34 through crank 54 which is pivotally attached at 56 to link 58 which is pivotally attached to arm 34 at 60. Also attached to arm 34 at 60 is link 62 which is pivotally attached at 64 to fixed plate 66.

In operation, as shaft 52 rotates at a constant speed, for example as shown in FIGURE 3, crank 54 acting through link 58 will cause arm 34 to reciprocate about pin 46. This motion is coordinated with the dropping of a parison from the conveyor system 26 into track 24.

The use of this type of linkage allows a velocity profile for member 32 such that the parison is inserted into the wheel quickly and yet so that considerable time elapses during the time member 32 is near each end of its path particularly the outermost end of its path during which time a new parison is being deposited in the loading track. Inherent in such an arrangement is the fact that the velocity change is smooth and thus the parison is less likely to be damaged than if a spring-operated or pneumatic impulse were used.

Figure 4:
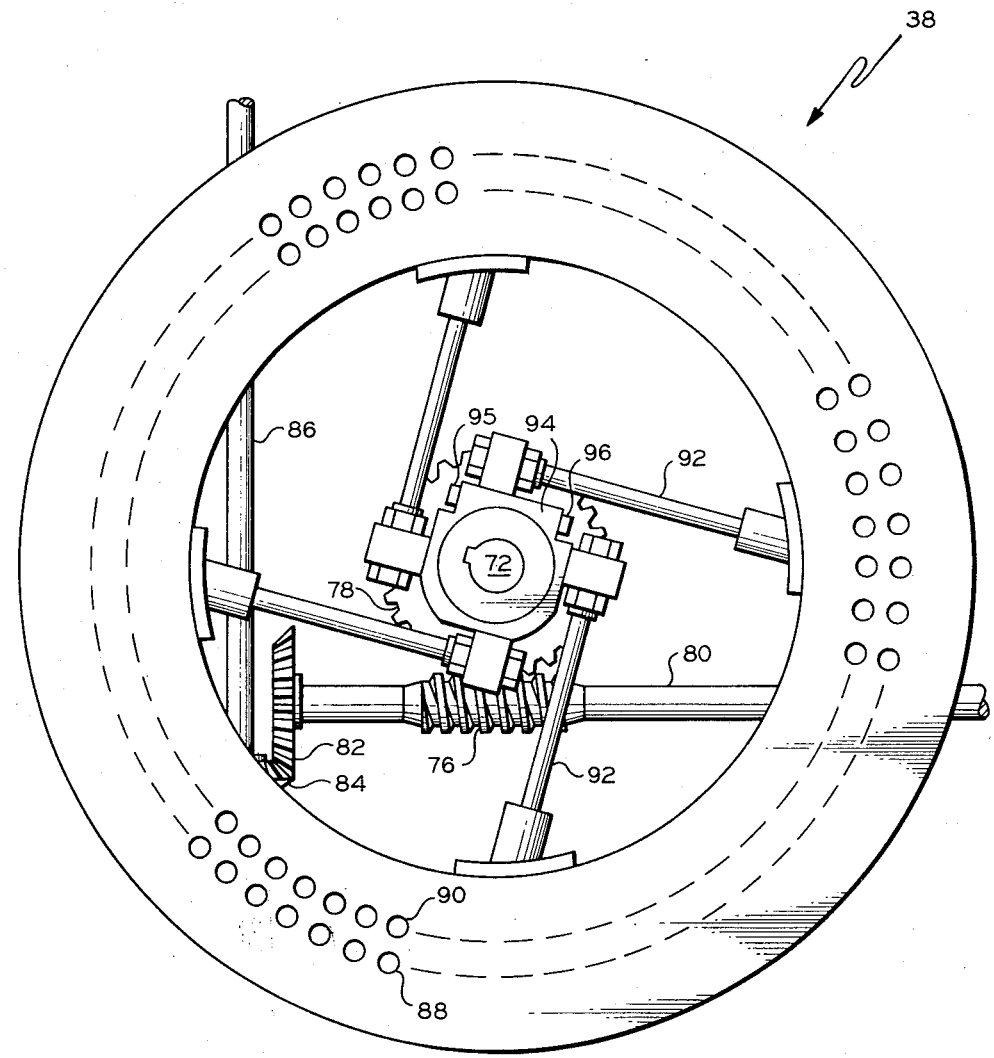
FIGURE 4 is a side elevational view of the heating wheel with parts removed for simplicity.
Figure 9:
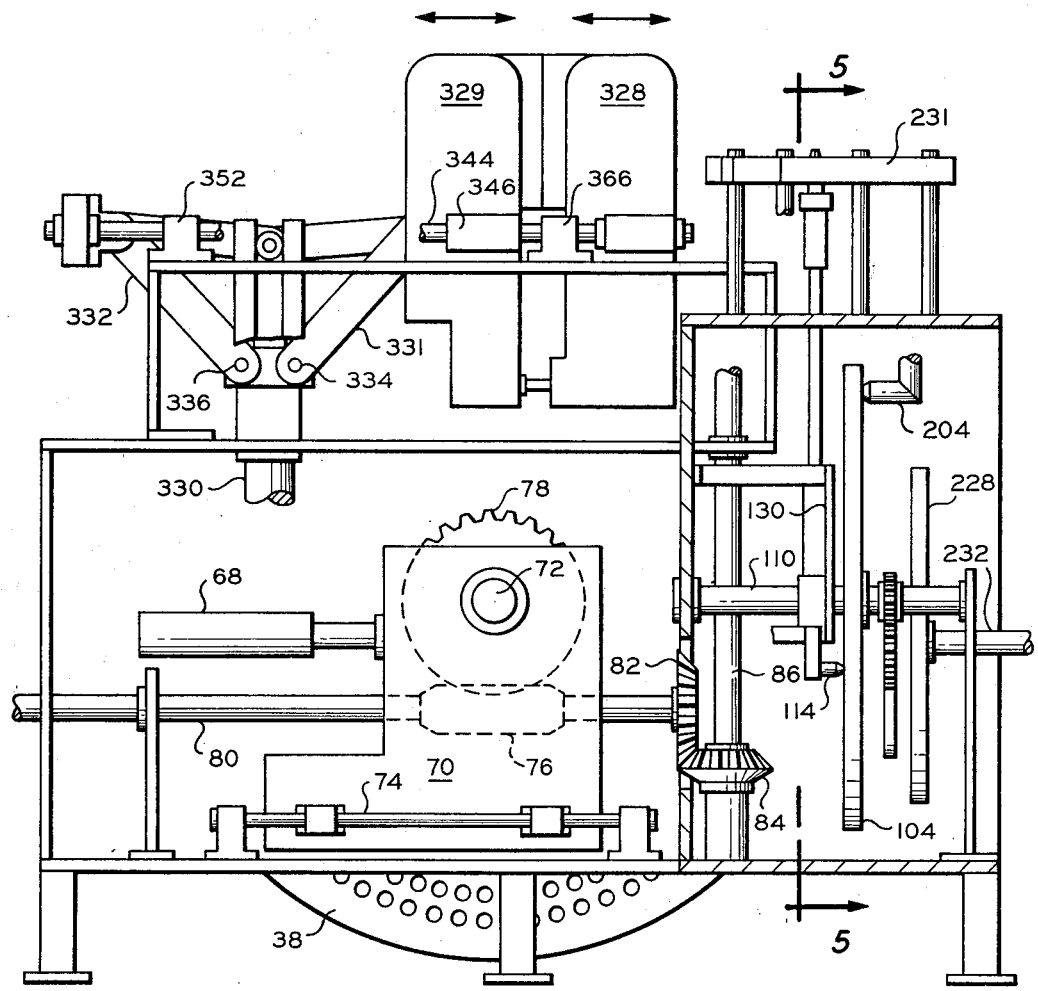
FIGURE 9 is a side elevational view of the machine with parts removed for simplification.

Referring now to FIGURES 4 and 9, the parison heater wheel 38 contains two concentric rows of parison heater holes. When one complete revolution has been made with the parison feeding device in front of one circle of holes, the heating wheel is shifted so that the parison feeder device is in front of the other circle of holes. Air cylinder 68 acting on housing 70 which supports parison wheel 38 by means of shaft 72 is actuated by a controller to move the housing 70 which is supported on rail 74 to align one or the other rows of holes with the parison feeder. A splined worm gear 76 intermeshes with pinion gear 78 to intermittently turn the parison heating wheel 38. The power for this turning is supplied through splined shaft 80 which is splined to worm gear 76. In other words, movement to the right or left of gears 76 and 78 will not change the position of shaft 80. Bevel gears 82 and 84 transfer power intermittently from shaft 80 to turret shaft 86 which intermittently turns the blowing heads.

Referring now specifically to FIGURE 4, the heater wheel containing two groups of heating holes forming an outer circle of holes 88 and inner circle of heating holes 90 is attached through flexure rods 92 to adjustable hub 94 which is attached to central shaft 72. The inner circle of holes 90 and the outer circle of holes 88 form concentric circles. Hub 94, having adjusting screws 95 and 96, makes the connection between flexure rod 92 and shaft or axis 72 thus serving as a support means to carry said wheel on said shaft. As can be seen the rods 92 are tangentially attached to hub 94. As the parison wheel heats up, it will expand radially. This radial expansion, the degree of which is dependent upon the temperature to which the wheel is heated, causes a flexure of rods 92 thus angularly displacing wheel 38 relative to hub 94. Adjusting screws 95 and 96 can be turned thereby rotating heater wheel 38 relative to hub 94, so as to adjust the indexing of the holes with the push member 32 and the parison transfer mechanism. The portion of hub 94 attached to flexure rods or spokes 92 is angularly adjustable about the inner portion of hub 94 attached to shaft 72 by means of adjusting screws 95 and 96. Hub 94 serves as the support means by which wheel 38 is supported on shaft 72.

The heating wheel 38 contains means to uniformly heat parisons in the holes 88 and 90. This heating means can be electrical or heated fluid. Electrical heating means is preferred.

Figure 5A:
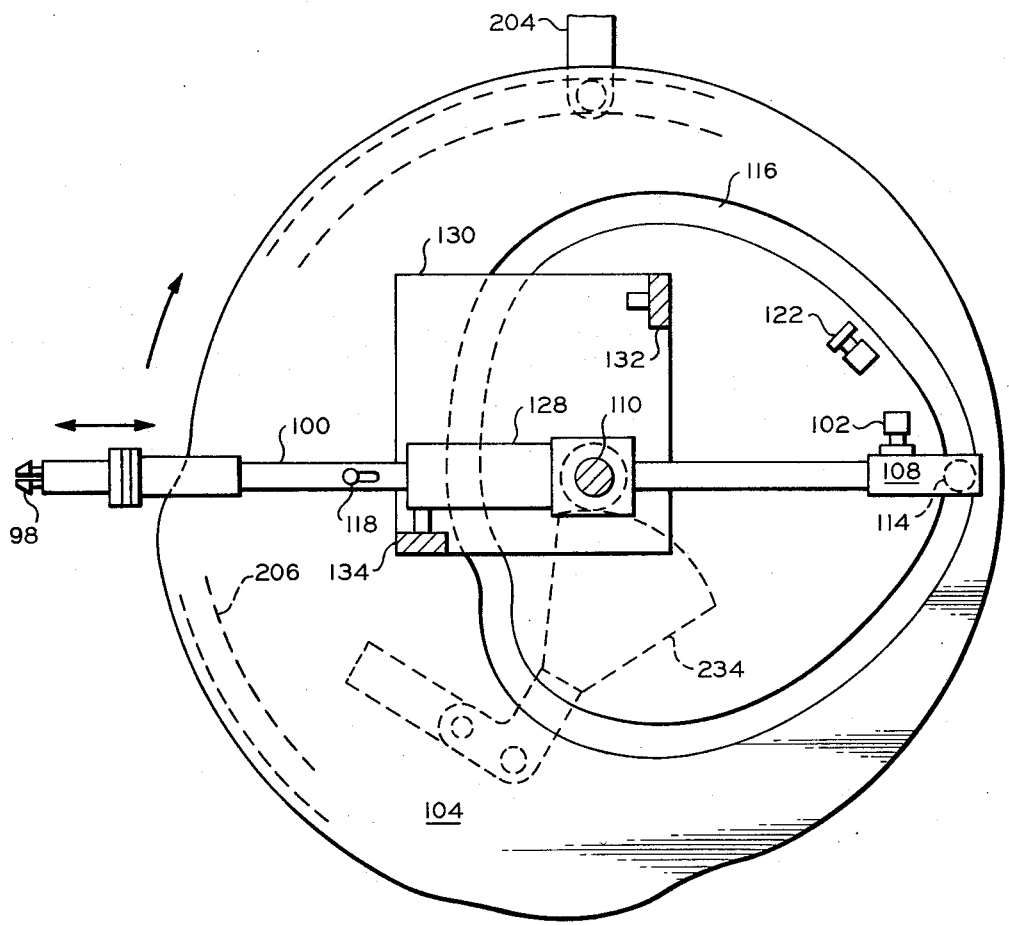
FIGURES 5a through 5f are views of a parison transfer mechanism at different stages of the camming operation as taken along lines 5—5 of FIGURE 9.
Figure 5B:
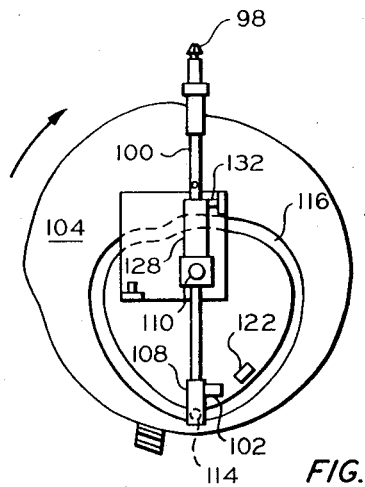
Figure 5C:
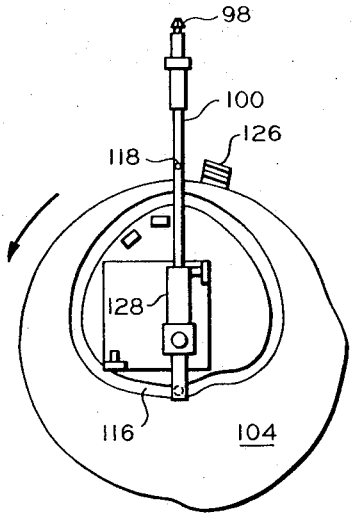
Figure 5D:
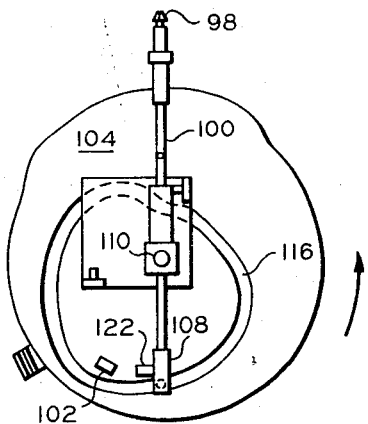

Referring now to FIGURES 5a–5f wherein the parison transfer mechanism is shown, there is provided a parison gripping means 98 and a transfer rod 100. The parison gripping means is inserted into the interior of a heated parison which is in position in one of the holes of the heating wheel. This gripping means is then expanded to grip the parison. The gripping means is then withdrawn, rotated about 90 degrees in the clockwise direction from the position shown in FIGURE 5a to a position such as shown in FIGURE 5b. This rotation is effected by the engagement of lug 102 attached to cam wheel 104 with member 108 (FIGURE 5a) on rod 100 and the rotation of cam wheel 104 90 degrees clockwise about shaft 110. The parison is then moved upwardly, and placed on mandrel 112 (see FIGURE 8); this is accomplished by the reversal of rotation of cam wheel 104 as depicted by FIGURE 5c. The cam follower 114 moving in a cam means in the form of cam track 116 on the back side of cam wheel 104 (FIGURES 5a–5f are on the back of cam wheel 104, that is, from a position facing the front of the machine) pushes transfer rod 100 upward to the position shown in FIGURE 5c. The parison gripping means 98 is relieved to release the parison as follower 118 engages cam slot 126 (not shown in FIGURE 5a). Rod 100 is then withdrawn to the position shown in FIGURE 5d by the further counterclockwise rotation of cam wheel 104. At this point there has been a counterclockwise rotation of 350 degrees. Lug 122 then engages member 108 and cam wheel 104 rotates a final 90 degrees to move transfer rod 100 to the position shown in FIGURE 5e. The total counterclockwise rotation is thus 440 degrees. The direction of rotation then reverses and cam follower 114 moving in cam track 116 pushes transfer rod 100 outward to the position shown in FIGURE 5f so as to position gripping means 98 within a parison (see FIGURE 6). The parison gripping means is expanded to grasp the parison as a result of cam follower 118 engaging cam surface slot 126 on rotating cam wheel 104. Cam wheel 104 continues to rotate in a clockwise direction as cam follower 114 moving in cam track 116 withdraws transfer rod 100 back to the position shown in FIGURE 5a. The total clockwise rotation is also 440 degrees. Rod 100 is slidable in rotatable collar 128 which rotates about shaft 110. Shaft 110 is rotatably supported by plate 130 attached to the frame of the machine. The extent of rotation of rod 100 in the clockwise direction is limited by stop member 132 attached to plate 130 acting against collar 128. The extent of rotation in the counterclockwise direction of shaft 100 is limited by stop member 134 attached to plate 130 and acting against member 128. After cam wheel 104 has completed its rotation in a given direction, transfer rod 100 being prevented from further rotation in that direction by stop member 132 or 134, and the direction of rotation of cam wheel reversed, rotation of the transfer rod back to its original position prior to engagement with lug 102 or 122 is prevented by a ball detent type positioning means engaging collar 128 (not shown).

Figure 6:
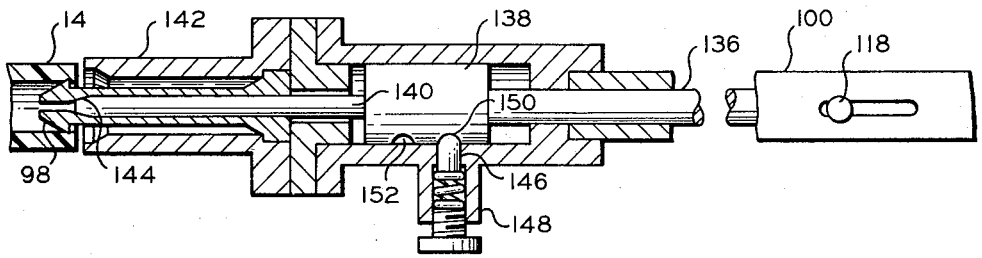
FIGURE 6 is a view partially in section (with a parison shown being gripped) of the transfer rod of FIGURES 5a–5f.

Referring now to FIGURE 6, rod 100 is hollow at the parison gripping end thereof. Shaft 136 is positioned in the hollow end of rod 100 and is attached to cam follower 118 which contacts cam slot 126 (not shown in FIGURE 6) at various parts of the parison transfer cycle as will be hereinafter described. Member 138 connects shaft 136 with frusto-conical ended gripper activation rod 140. Gripping means 98 within annular collar 142 has inwardly beveled edges 114 at the outer portion thereof which edges 144 act against a conically shaped end of gripper activation rod 140. A ball detent mechanism comprising spring loaded pin 146 within collar 148 locks member 138 in one of two positions, by falling into indentations 150 and 152 on the surface of member 138.

As cam slot 126 forces cam follower 118 to the forward position as shown in FIGURE 6, rod 136 forces member 138 forward so that pin 146 lodges in indentation 150. This motion of member 138 pushes gripper activation rod 140 forward, thereby forcing gripping means 98 outwardly to grasp parison 14. Conversely, when cam slot 126 forces cam follower 118 inwardly as shown in FIGURE 5c, member 138 is moved inwardly to move pin 146 into indentation 152. This motion releases the parison by allowing gripping means 98 to contract back toward the center.

In operation and with reference to FIGURE 5a, the gripping means 98 grips the parison and withdraws the parison from the heating wheel. Cam wheel 104 is rotating in a clockwise direction as viewed from the back as is done in FIGURES 5a–5f thus withdrawing the parison. Lug 102 on cam wheel 104 comes in contact with member 108 of rod 100, thereby causing rod 100 to rotate clockwise along with wheel 104 until stop member 132 contacts collar 128. At this point, rotation of wheel 104 in the clockwise direction will cease. Referring to FIGURE 5c, wheel 104 begins to rotate in the counterclockwise direction, thereby causing rod 100 carrying parison 14 (not shown) to move upwardly with respect to wheel 104. A spring loaded ball detent mechanism similar to that described above to retain the parison gripping means in one of two positions is used to hold collar 128 at each of its two stationary positions in contact with either stop 132 or 134. At the top portion of the cycle (FIGURE 5c), a block cam slot 126 fixed to wheel 104 contacts follower 118 to release the parison gripping means 98.

Figure 5E:
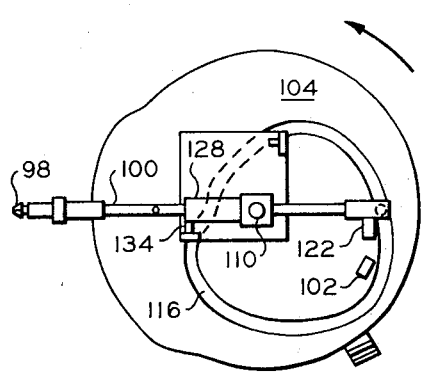
Figure 5F:
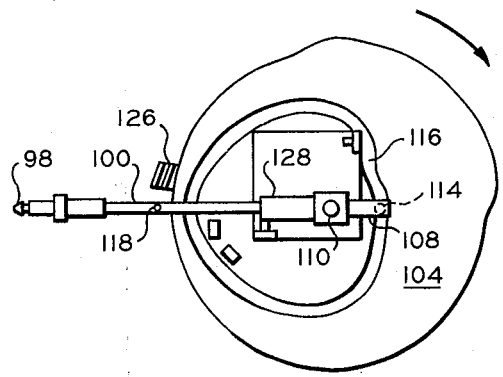

After the parison has been released and the cam wheel 104 continues to turn in a counterclockwise direction the rod 100 will be drawn downwardly with respect to shaft 110. When wheel 104 has rotated to the point where lug 122 contacts member 108 (FIGURE 5d), then rod 100 will rotate counterclockwise with wheel 104 until rotatable collar 128 is contacted by stop member 134 as shown in FIGURE 5e. At this point, wheel 104 begins a clockwise movement, thereby extending rod 100 into the parison heater wheel to pick up another parison. The action of cam slot 126 serves to force members 98 outwardly to thereby grip the parison (see FIGURE 5f where this has just occurred.) As the wheel 104 continues to rotate in a clockwise direction, the rod 100 will be withdrawn to the position shown in FIGURE 5a and the cycle will begin anew.

Referring now to FIGURES 1, 7, 8, and 9, turret shaft 86 contains three identical support members 154, 156, and 158, each supporting an identical blowing head 160 which serves as a holding means for the parisons.

Figure 8:
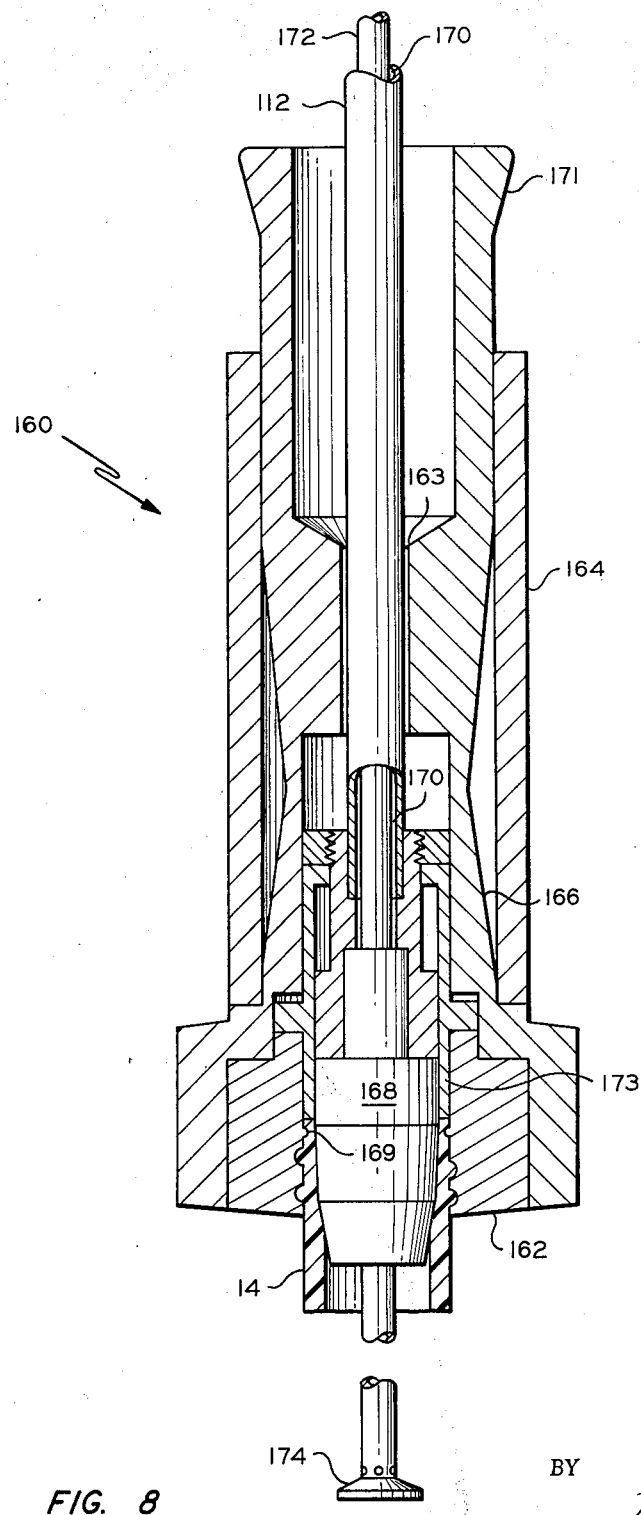
FIGURE 8 is a sectional view of the blowing head of FIGURE 7 (with a parison in place)

Referring specifically to FIGURE 8, each blowing head 160 contains a hollow mandrel 112 and a plurality of gripping jaws 162. The gripping jaws are actuated by means of collar 164 which slides down engaging first tapered surface 166 of gripping jaws 162 causing them to converge so as to grip one end of parison 14 between tapered Teflon (registered trademark) TFE plug 168 on mandrel 112 and said jaws. The tapered plug is reciprocable and is moved downward to aid in causing the parison to conform to the shape of the gripping jaws thereby forming the thread and/or neck area when the article being molded is a container. This plug can be made of material other than Teflon (registered trademark) TFE although a low heat conductivity high melting material such as polytetrafluoroethylene having a low frictional drag on the hot polymer is highly preferred. This plug can also be stationary or expandable. As tapered plug 168 moves down, the contact of the tapered surface with the parison causes the thermoplastic material to flow laterally around annular ridge 169 which prevents further downward movement of the plug from pushing the parison axially out of the gripping jaws, but rather allows lateral flow of the thermoplastic material into the threads and/or other contours of the neck forming area as the plug continues its descent. The plug can have an initial deep taper followed by a shallower taper or a single taper or even a curved surface such as a radius. During the last fraction of an inch of downward travel of the plug, annular collar 173 is engaged and moved down against the end of parison 14 thus further aiding in forming the neck area.

This operation has been described in the specification and claims in terms of the neck forming portion of the apparatus being above the parison but it is also within the scope of the invention for the whole apparatus to be inverted or even for this apparatus to be disposed laterally since the parisons at the orientation temperature can be self-supporting, and thus the terms such as up or down as used in the specification and claims are meant to describe the relative movement of the parts and not to limit the invention to a vertically disposed apparatus.

After the parison has been stretched, blown, and moved to an ejection station, collar 164 is moved upwardly contacting second tapered surface 171 so as to expand gripping jaws 162 by pivoting the segmented gripping jaws about point 163 on mandrel 112 and thus allowing ejection of the part. Blowing fluid is introduced into the interior of the parison through annulus 170 between hollow mandrel 112 and rod 172 which carries stomper foot 174. Other means for intoducing fluid into the parison can also be used. For instance, rod 172 can be hollow, a blow needle can be inserted through the side of the parison, or the bottom of an open end parison can be closed around a blow pin. It is also within the scope of this invention to cause the parison to conform to the shape of the mold by means of a vacuum applied through openings in the mold walls in which case said means for introducing fluid pressure serves as a vent to the atmosphere. T member 176 (FIGURE 7) which pivots about pin 177 and which contains cam follower 178 moves collar 164 down as follower 178 is contacted by cam surface 180. A ball detent type device holds member 176 in whichever position it is placed by the cams which act on it. Mandrel 112 is connected to T member 182 which pivots about pin 183. Mandrel 112 carrying plug 168 is forced downwardly by T member 182 when contacted by cam surface 192 to force plug 168 into the parison to cause the parison to conform to the shape of the gripping jaws. After being pushed downwardly, mandrel 112 is prevented from returning by a ball detent in the arm extending from supporting structure 184 which holds said T member.

The three blowing heads provide for three stations in the molding process. A parison stretching (and optional pinch off) station; a parison molding station at which the stretched parisons are blow molded; and an article removal station. The use of multiple stations reduces the time the mold is left open and unproductive and thus increases the number of blown articles that can be produced from a single mold in a given time.

The upward movement of rod 186 carries member 188 upwardly. Supporting structure 190 (on member 188) having cam surfaces 180 and 192 is also carried upwardly. Cam surface 180 contacts cam follower 178 to cause gripping jaw 162 to clamp about parison 14. Cam surface 192 contacts cam follower 194 to cause downward movement of mandrel 112. T members 176 and 182 are pivotally attached to arms extending from supporting structure 184. T member 176 is attached to collar 164 of blowing head 160 and T member 182 is attached to hollow mandrel 112 and both are held in the up or down position by a ball detent in supporting structure.

Figure 1:
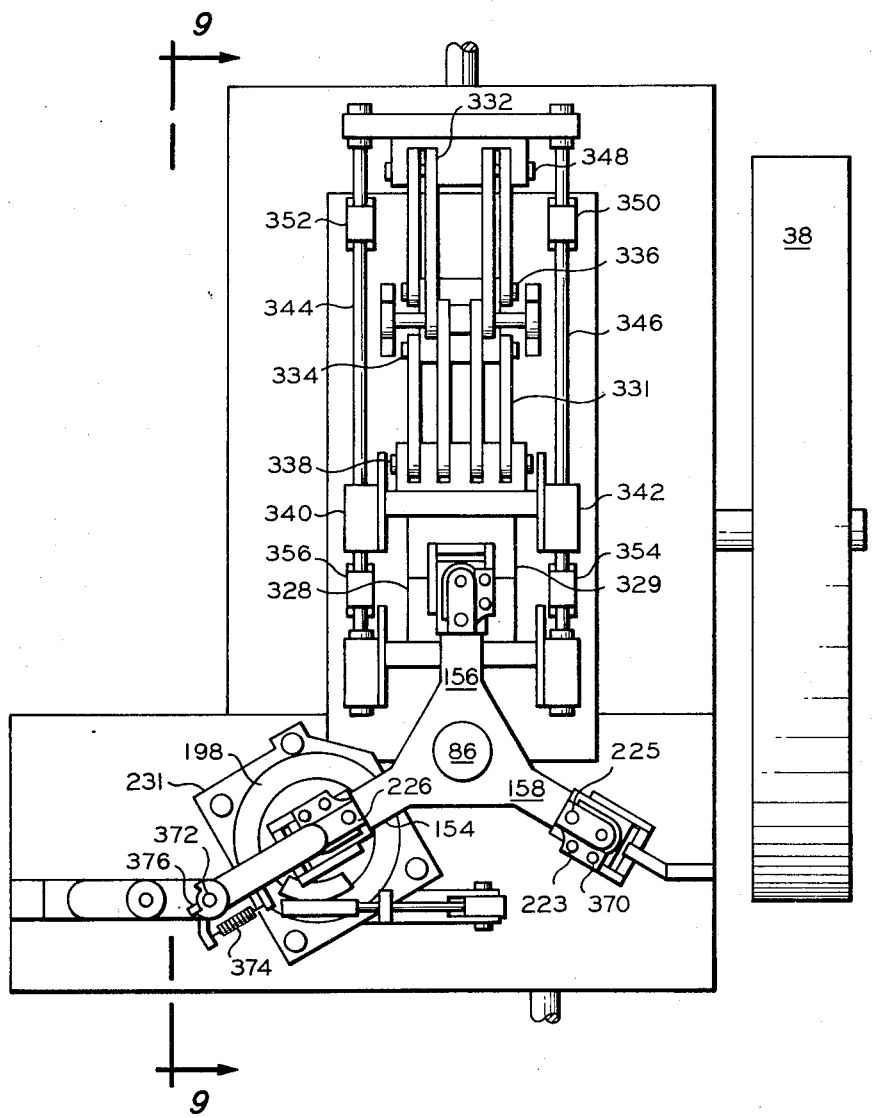
FIGURE 1 is a plan view of a machine according to the invention with the parison feeder not shown.
Figure 10:
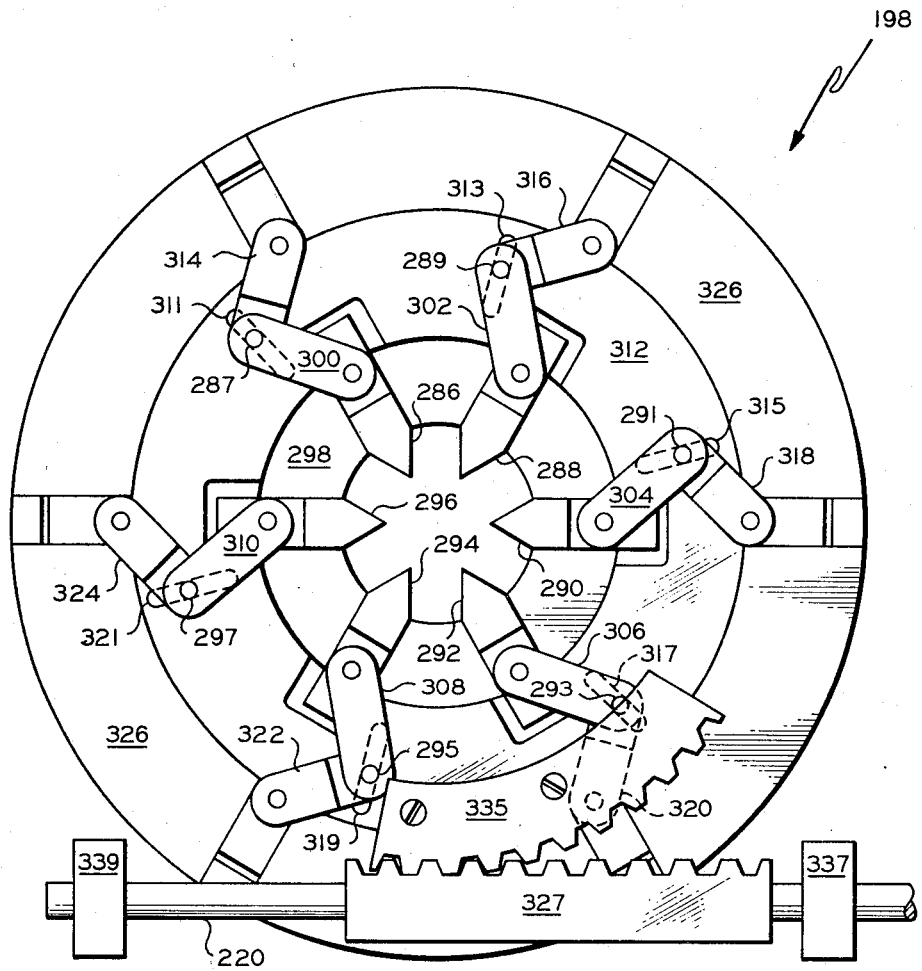
FIGURE 10 is a plan view of the pinch-off mechanism.

After the parison has been grasped by the thread and neck forming means (mandrel 112 carrying plug 168 and jaws 162), it is pinched off at the bottom portion thereof by pinch-off means 198 (see FIGURE 10). Other conventional pinch-off means can be used or a closed end parison requiring no pinch off can be used. A stomper foot 174 presses down against the parison in the seal area to provide an improved seal in the parison. This stomper foot 174 carried by rod 172 is forced downwardly by member 200. The stomper foot is held in the down position by a linear one way clutch 201 in another arm extending from supporting structure 184. The pinch-off device is actuated by the engagement of cam follower 204 in cam track 206 in the front of cam wheel 104. Follower 204 moves upwardly causing member 210 to pivot about a pin. This causes member 216, pinned at 218 to rotate so as to push member 220 inwardly, thus activating the pinch off. A spring 222 biases the rod 172 upwardly when not locked in the down position by the linear one-way clutch 201. Spring 222 is supported by member 226 attached through supporting structure 184 to member 154 (or 156 or 158). A support guide, slidably supported by rods 223 and 225, guides and supports the upper end of rod 172. This is shown in FIGURE 1 but not in FIGURE 7 for the sake of simplicity.

Figure 7:
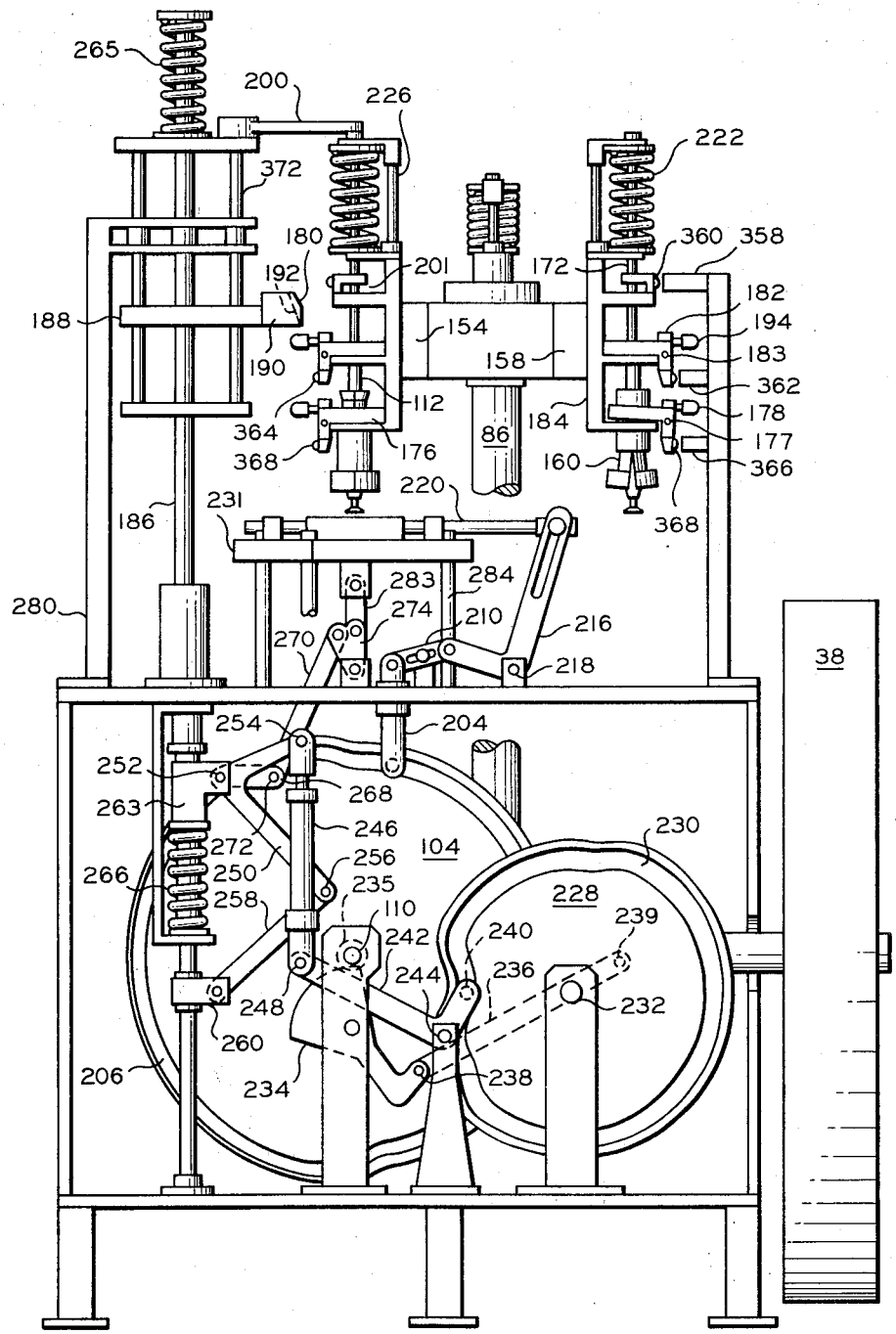
FIGURE 7 is a front elevational view of the machine with parts not shown for the purpose of simplicity.

Referring now specifically to FIGURE 7, the actuation of pinch-off device 198 (see FIGURES 1 and 10) is effected by downward movement of follower 204 attached at the upper portion through a series of linkages to pinch-off device actuating member 220. Cam follower 204 rides in cam track 206 in cam wheel 104. Wheel 104 rotates on shaft 110 about an angle of approximately 440 degrees. Power is supplied to cam wheel 104 by cam wheel 228 which contains cam track 230 which cam track actuates the downward movement of a stomper foot 174, the closing of jaws 162, and also the movement of mandrel 112 and the movement of table 231 as will be described hereinafter. Shaft 232 supplies rotational power to cam wheel 228. The rotation of cam wheel 228 causes the reciprocal rotation of sector gear 234 which motion drives pinion gear 235 attached to cam wheel 104 to reciprocally rotate cam wheel 104 through an angle of about 440 degrees. Sector gear 234 is connected to cam wheel 228 through crank arm 236 which is pinned to sector gear 234 at 238 and is pinned to cam wheel 228 at 239.

The movement of follower 240 in cam track 230 causes member 242, pivotable about point 244, to pull downwardly member 246, attached at 248 to said member 242. The downward movement of member 246 causes rotation of member 250 in a clockwise direction about pin 252 in member 263. Member 263 is biased against a collar extending downward from the frame by spring 266. Member 250 is attached at pin 254 to said member 246. Member 250 is also attached at pin 256 to member 258. As rotation of 250 continues, the lower portion of 250 becomes substantially parallel to and aligned with member 258 which is rotatably attached to collar 260. Collar 260 is fixedly attached to rod 186 which at the top portion thereof is connected to member 200. This latter member bears down on the top portion of rod 172, thereby causing downward movement of stomper foot 174. Member 263, to which member 250 is pivotably attached, slides on rod 186. Adjustable spring 265 determines the pressure which the stomper foot will exert against the bottom of the parison. Then further downward movement of 246 compresses spring 266 and pulls stomper foot 174 and table 231 down at the same rate.

As member 263 moves upwardly and downwardly, it causes arm 268 fixed to member 263 to move in the same direction. Member 270, attached at 272 to member 268, is attached through members 274 and 283 to table 231. Table 231, which supports pinch-off mechanism 198, slides up and down on legs 284 and serves as a support means for the closed end of parison 14.

Referring now to FIGURE 10, a plurality of jaws 286, 288, 290, 292, 294, and 296 are attached reciprocably to ring 298 which is stationary. Linkages 300, 302, 304, 306, 308, and 310 are rotatably attached at one end to jaws 286, 288, 290, 292, 294, and 296, respectively, and at the other end they are slidably and rotatably attached to plate 312 through pins 287, 289, 291, 293, 295, and 297 moving in slots 311, 313, 315, 317, 319 and 321 and rotatably attached to linkages 314, 316, 318, 320, 322, and 324, respectively. The last mentioned linkages are rotatably attached at the opposite ends to fixed plate 326. Plate 312 is rotatable about the central area and is actuated to rotate by rack 327 attached to pushed member 220 acting on pinion segment 335 attached to 312. Member 220 is slidably supported in members 337 and 339. The rotation back and forth of plate 312 causes jaws 286, 288, 290, 292, 294, and 296 to reciprocate toward and away from the central area. A parison to have its end closed is placed in the central area and is accordingly pinched to seal the end of the parison and, if desired, completely pinched off to separate the material below the sealed end completely from the upper portion of the parison by the action of jaws 286, 288, 290, 292, 294, and 296 moving together in the central area toward a point.

In a preferred embodiment the jaws do not come all the way together initially but rather come together only enough to close and seal the end of the parison. The stomper foot then comes down to aid in forming the seal. The jaws then come completely together to sever the parison and the table carrying pinch-off means 198 descends stretching the parison. The stomper foot descends at the same rate so as to maintain pressure on the bottom of the parison. In an alternate embodiment the table and stomper foot can descend, after the initial pinching (clamping), to stretch the parison and then after the stretching is complete the jaws then move on in pinching off or severing the parison. It is also within the scope of the invention to use a closed end parison in which case no pinch-off mechanism is required. In either case, where a parison is constricted by a pinch-off means, or, as where a closed end parison is used, the stomper foot seats against the inside of the closed end of the parison, holding said parison against the pinch-off mechanism or other member on table 231 which serves as a support means. Then the downward movement of stomper foot 174 and table 231 stretch the parison which is restrained at the other end by the parison holding means of blowing head 160.

Referring now to FIGURES 1 and 9, after the parison has been pinched off and stretched, it is moved from the stretch station as represented by the position of support member 154 to the blow molding station as represented by the position of support member 156. At that point, it is enclosed in blow mold parts 328 and 329 and blown to a desired configuration. The blow mold parts 328 and 329 are actuated by an air cylinder (not shown) which reciprocates shaft 330 up and down. Shaft 330 is connected to members 331 and members 332 through pins 334 and 336 respectively. Members 331 are connected to mold part 329 through pin shaft 338. Mold half 329 is slidably carried by bearings 340 and 342 on rods 344 and 346. Members 332 are attached through pin shaft 348 to rods 344 and 346. Rods 344 and 346 are slidably supported by bearings 350, 352, 354, and 356. As shaft 330 moves down and up it imparts a back and forth movement to mold half 329 through members 331. The down and up motion of shaft 330 also imparts a back and forth movement to mold half 328 through members 332 which move rods 344 and 346 which carry mold half 328 on bearings 350, 352, 354, and 356. This movement of shaft 330 causes mold halves 328 and 329 to move together to form a mold cavity and then apart to open the mold cavity. When the mold halves 328 and 329 have closed around the parison to form the mold cavity, air is introduced into the interior of the parison, to blow the part. The part can also be formed by pulling a vacuum through the mold walls so as to create the pressure differential between the inside of the parison and the molding surface of the mold parts which expands the parison.

Referring now to FIGURES 1 and 7, after the article has been blown, shaft 86 is rotated about 120 degrees so that the blown article is moved to the discharge station as represented by the position of support member 158. At this station, cam block 358 on frame 280 contacts release member 360 pivotably supported by an arm extending from supporting structure 184 to release linear one-way clutch and allow rod 172 to return to the uppermost position of support member 226 under the action of spring 222. Similarly, cam block 362 contacts cam follower 364 on T member 182 thereby lifting hollow mandrel 112. At the same time block 366 cams against cam follower 368 on T member 176 to release the gripping jaws 162. Air can then be blown in through the blowing nozzle to insure discharge of the blown article from the mandrel 112. The article should fall under the action of gravity from the blowing head 160. Other ejection means such as a mechanical ejection can also be used to insure discharge of the article. As the shaft 86 is rotated the next 120 degrees to bring the empty blowing head 160 into position to receive a new heated parison, rod 370 strikes member 200, which is in the down position at this time, and pivots it about shaft 372 against the tension of spring 374 which normally holds member 200 against stop 376. When rod 186 is moved upward by cam track 230 in cam wheel 228 acting on follower 240 and moving the connecting linkages 242, 246, 250, 258, 263, and 260 in the reverse direction to that previously described for the stomping and drawing steps, member 200 slides along rod 370 until it clears its uppermost end then it returns to its normal position against stop 376 ready to engage rod 172 during the next stomping and drawing steps.

Whereas the invention has been described with reference to a molding machine having a pinch-off device 198, it is within the scope of the invention to eliminate the pinch-off device by employing a parison which is open at one end and closed at the other end. The stretch rod alone may be used to stretch the parison or a movable platform can be used in lieu of pinch-off device 198 to aid the stomper foot 140 in stretching the closed end parison.

Many standard parts such as temperature controllers, relays, detents, and the like have not been shown in the drawing for the sake of simplicity but their inclusion is understood by those skilled in the art and is within the scope of the invention.

While this invention has been described in detail for the purpose of illustration, it is not to be construed as limited thereby but is intended to cover all changes and modifications within the spirit and scope thereof.

We claim:
1. Apparatus for blow molding biaxially oriented articles from tubular parisons comprising:
(A) a first station having
(1) a means to transfer a parison to said first station,
(2) a first holding means for gripping an end of a tubular parison at said first station,
(3) a means for stretching a parison on said first parison holding means at said first station,
(B) a second station having
(1) a second holding means for gripping an end of tubular thermoplastic parison,
(2) mold cavity means so positioned as to close around a tubular parison on said second holding means,
(3) means to expand a parison on said second holding means when said mold cavity means are closed around said parison on said second holding means, and
(C) means for moving said first holding means to said second station.

2. An apparatus according to claim 1 wherein said first station of (A) further comprises:
(4) a means for severing and sealing an end of a thermoplastic parison held at said first station by said first holding means.

3. An apparatus according to claim 1 wherein there is further provided:
(D) a third station having
(1) a third holding means for gripping an end of a tubular parison,
(2) means for removing a blown article from said third holding means; and
(E) means for moving said second holding means to said third station.

4. An apparatus according to claim 3 wherein said moving means of (C) and (E) comprise a turret shaft; first, second, and third supporting members attached to said turret shaft and to said first, second, and third holding means, respectively, said first, second, and third holding means being spaced around a circular locus about 120 degrees apart; and means to rotate said turret shaft in increments of about 120 degrees so as to move said second holding means to said third station and said third holding means to said first station simultaneous with moving said first holding means to said second station.

5. An apparatus according to claim 1 wherein said parison transfer means of (A)(1) comprises:
(a) parison gripping means to be inserted into the interior portion of a tubular parison, said gripping means being expandable to hold said parison,
(b) a collar rotatable around a point,
(c) a transfer rod attached to said parison gripping means, said transfer rod being axially slidable in said collar,
(d) a cam wheel rotatable about said point,
(e) cam means on said cam wheel to actuate reciprocation of said transfer rod,
(f) a cam follower on said transfer rod, said follower operably engaged with said cam means,
(g) first lug means fixedly attached on said cam wheel being positioned so as to contact said transfer rod when said cam wheel rotates in a first direction, and thereby rotates said rod in said first direction,
(h) first fixed stop member to limit the rotation of said transfer rod in said first direction,
(i) second lug means fixedly attached on said cam wheel being positioned so as to contact said transfer rod when said cam wheel is rotated in a second direction and thereby rotate said transfer rod in said second direction,
(j) a second fixed stop member to limit the rotation of said transfer rod in said second direction,
(k) means to rotate said cam wheel sequentially in said first direction and in said second direction,
(l) means on said transfer rod to actuate the expansion and contraction of said gripping means, and
(m) means on said cam wheel to cause said actuation means of (l) on said transfer rod to expand said gripping means when said gripping means is in a first position to grasp said parison, and to cause said actuation means of (l) on said transfer rod to contract said gripping means when said gripping means is in a second position at said first station when said parison has been delivered to said parison holding means.

6. An apparatus according to claim 1 wherein said stretching means of (A)(3) comprises:
   (a) a parison support means for supporting a closed end of said parison held by said first holding means of (A)(2),
   (b) a foot member attached to a rod carried by and extending through said first holding means of (A)(2), said foot member being adapted to seat against the inside of a closed end of said parison,
   (c) means to lower said parison support means of (a) and said rod member of (b) simultaneously while said parison is held by said first holding means of (A)(2) so as to stretch said parison longitudinally.

7. An apparatus according to claim 6 wherein said rod member of (A)(3)(b) is biased in the up position and there is further provided:
   (d) a means for releasably holding said rod means of (b) in the down position.

8. An apparatus according to claim 6 wherein said first holding means of (A)(2) comprises:
   (a) a mandrel carrying a tapered plug insertable into said parison,
   (b) a neck forming means comprising at least two jaw members which reciprocate toward and away from said mandrel to grasp a parison on said mandrel, each of said jaw members having a first and second cam surface, and
   (c) a collar slidably positioned around said jaw members, said collar adapted to engage said first surface of said jaw members to cause said jaw members to reciprocate inward to clamp said parison and thereafter to engage said second surface of said jaw members causing them to reciprocate outward to release said parison.

9. Apparatus according to claim 8 wherein there is further provided:
   (D) a third station having
       (1) third holding means for gripping an end of a tubular parison,
       (2) means for releasing said rod of (A)(3)(b) to allow retraction of said foot member,
       (3) means to release said mandrel of (A)(2)(a) so as to retract said mandrel,
       (4) means to slide said collar of (A)(2)(c) into contact with said second surface of said jaw members,
       (5) means for removing a blown article from said third holding means, and wherein said moving means of (C) comprises a turret shaft; first, second, and third supporting members attached to said turret shaft and to said first, second, and third holding means, respectively, said first, second, and third holding means being spaced around a circular locus about 120 degrees apart; and means to rotate said turret shaft in increments of about 120 degrees so as to move said second holding means of (B)(1) to said third station, and said third holding means of (D)(1) to said first station simultaneous with moving said first holding means to said second station.

10. An apparatus according to claim 1 wherein said mold cavity means of (B)(2) comprises:
    (a) first and second mold parts, said first mold part being slidably attached to and supported by a pair of rods, said second mold part being fixedly attached to said pair of rods such that when said first mold part is adjacent said second mold part, said mold parts are closed around said second holding means of (B)(1),
    (b) means to reciprocate said first mold cavity means along said rods, and
    (c) means to reciprocate said rods synchronously with said means of (B)(2)(b) such that said mold parts simultaneously open and close about said parison on said second holding means.

11. An apparatus comprising:
    (1) hopper means so shaped as to hold a plurality of tubular articles,
    (2) conveyor means containing a plurality of troughs for removing said tubular articles singularly from a bottom portion of said hopper means,
    (3) loading track means,
    (4) means for removing said tubular articles from said conveyor means of (2) and placing each of said tubular articles on said loading track means of (3),
    (5) means for intermittently pushing each tubular article along said loading track means,
    (6) an article heating device into which each tubular article is fed, said article heating device comprising
        (a) a wheel member rotatable about an axis,
        (b) at least two groups of holes in said wheel member, said groups forming concentric circles about said axis,
        (c) heating means in said wheel member to heat articles in said holes,
        (d) support means to support said wheel member on said axis, and
        (e) means to laterally move said axis a distance equal to said distance between said concentric groups of holes,
    (7) a means for removing heated articles from said holes in said wheel member, then passing said heated articles to a first station,
    (8) first holding means for gripping an end of said tubular article at said first station,
    (9) means for stretching said heated article on said first holding means at said first station,
    (10) a second station,
    (11) a second holding means for gripping an end of a tubular article at said second station,
    (12) at least two mold parts so positioned as to close around said tubular article on said second holding means at said second station to form a mold cavity,
    (13) means to expand said tubular article on said second holding means when mold parts are closed around said article on said second holding means,
    (14) means for moving said first holding means to said second station, and
    (15) means for recovering said expanded article.

References Cited

UNITED STATES PATENTS

| | | |
|---|---|---|
| 2,819,490 | 1/1958 | Froot. |
| 2,940,120 | 6/1960 | Grebowiec. |
| 2,940,121 | 6/1960 | Sherman. |
| 3,019,480 | 2/1962 | Soubier. |
| 3,048,890 | 8/1962 | Soubier. |
| 3,079,637 | 3/1963 | Marzillier. |
| 3,343,210 | 9/1967 | Guignard _____ 264—98 X |

WILBUR L. McBAY, Primary Examiner

U.S. Cl. X.R.

18—20; 264—94, 96, 98